Patented Oct. 19, 1943

2,332,403

UNITED STATES PATENT OFFICE 2,332,403

RECOVERY OF ZINC DUST

James A. Smail, Youngstown, Ohio, assignor to Republic Steel Corporation, Cleveland, Ohio, a corporation of New Jersey No Drawing. Application January 23, 1942, Serial No. 427,969

2 Claims. (Cl. 75—88)

This invention relates generally to the art of recovering metals from partially oxidized metallic materials and particularly to the recovery of zinc from by-products of galvanizing operations, such as zinc dust, zinc ashes and sal skimmings.

In the galvanizing of pipe, clean pipe which was free from scale and dirt and had been coated with zinc ammonium chloride is immersed in a bath of molten zinc until it is suitably coated with zinc, and is then withdrawn. To remove excess molten metal from the inside surface of the pipe steam at high pressure is blown thru the pipe. This steam projects molten zinc from the inside of the pipe into a box, known as a dust catcher, where such zinc is collected in a fine state of subdivision. Some of the zinc so removed from the pipe collects outside of the dust catcher and in other places where it is exposed to moisture from the steam and hardens into lump form. This material, whether in finely divided or lump form, is known as zinc dust.

From time to time oxidized zinc, foreign material, and small particles of zinc are skimmed from the exit side of the zinc bath and such material is known as zinc ashes. Periodically zinc ammonium chloride is added to the entry side of the galvanizing bath and later the bath is skimmed. The material so removed is known as sal skimmings and contains oxidized zinc, small zinc pellets, foreign material and chlorides.

Heretofore efforts have been made to recover zinc values contained in one or more of these three by-products by melting operations but these efforts have not been entirely successful as measured either in terms of percentage of metal recovered or in the cost of recovery. The high costs and low recoveries are traceable, I believe, to the physical state of the finely divided metallic zinc, the oxide coatings thereon, the oxidized material present, the high temperature required which results in further oxidation of metal values, and possibly to the presence of some non-metallic materials, for these various things interfere with an efficient recovery of metallic zinc by direct melting.

The present invention provides a new and improved procedure for recovering metal values from finely divided, partly oxidized metallic material. Altho the invention is applicable to various metals it is particularly applicable to the recovery of zinc from the aforesaid by-products and avoids the several disadvantages of prior processes as just mentioned and results in higher recoveries of zinc.

According to the present invention the by-products, unless they are initially in a suitable condition, are first treated to fit them for treatment by subsequent steps of the process. Zinc ashes and sal skimmings are treated to separate the particles of zinc from foreign materials, oxides and chlorides. This treatment may consist of grinding, crushing or otherwise reducing the size of the material, as for example by tumbling in a ball mill, and then screening the material. The material which remains on the screen is suitable for subsequent treatment by the present process. Preferably, a 16 mesh screen is used. Sal skimmings which possess a sufficient amount of plasticity to interfere with expeditious crushing may be readily reduced to the desired size by adding zinc ashes thereto during the crushing or tumbling operation. Zinc dust need not be subjected to tumbling or screening for it is initially in a satisfactory condition for treatment by subsequent steps of this process.

In the interests of brevity and certainty the term "zinc dust" is used herein to mean and include zinc dust as described above and also zinc ashes and sal skimmings from which oxides and foreign materials have been removed, as by the tumbling and screening operations just described.

The "zinc dust" is mixed more or less uniformly with a suitable flux and the mixture is heated in a suitable pot or crucible until the charge becomes liquid. Ammonium chloride and zinc ammonium chloride have been found to be suitable as fluxes. The amount of flux to be used may range from about one pound to more than ten pounds per one hundred pounds of "zinc dust." One pound gives some recovery; two pounds give fairly good recoveries; from five to eight pounds of flux give quite satisfactory recoveries. Greater amounts of fluxes may be used, if desired, but the benefits traceable to more than about ten pounds to about one hundred pounds of "zinc dust" are not particularly important and the cost is thereby increased. Ammonium sulfate appears to cause some coalescing of the small zinc particles in the "zinc dust" and may, therefore, be used as a flux, but it is not as efficient as the fluxes just mentioned. Apparently any flux can be used which can react with the oxides on the metal particles in such a way as to enable the particles to unite. Probably the flux breaks down the surface tension of the oxide film on the particles or deoxidizes the particles wholly or in part by converting the oxides into salts of the acid present in the flux. Also apparently any oxidized metal which has oxidized surfaces that can be so affected may be treated by this process.

Any suitable pot or crucible may be used for the melting operation but graphite crucibles are preferred for maximum efficiency and durability of equipment.

The melting operation may be carried out conveniently and expeditiously as follows:

The furnace atmosphere surrounding the pot or crucible is heated to a temperature of about 1000° F. or higher. The furnace temperature should be sufficiently high to heat the inside of the crucible and its contents to above about 900° F. In general, the higher the temperature of the crucible the shorter is the time required for liquefying the charge of "zinc dust" and flux. Temperatures of 1550° F. to 1650° or even of 1700° F., which is the boiling point of zinc, may be used if desired. A temperature of 900° F. to 1000° F. is high enough to melt the zinc and to hold it in liquid form for pouring or casting. The higher temperatures may cause unnecessary oxidation of the molten zinc during casting.

When the charge of "zinc dust" and flux has been melted in the pot or crucible it is preferable to pour off or dip out the slag which is on top of the molten zinc and to reserve part of that slag, in liquid form, for use with the next charge. After removal of the slag the molten zinc may be cast, for example, by being poured into iron pans. In making up the next charge it is preferable to return to the crucible, preferably in molten condition, some of the slag just previously removed from the crucible. Then the next charge of "zinc dust" and flux is added and more slag may be placed on top of the charge if desired. The amount of slag which can be used with such a charge will vary somewhat under different operating conditions, but the amount so used should not be sufficient in amount to make the resulting slag so viscous that it will interfere with the maximum recovery of zinc.

Zinc recovered by the present invention from "zinc dust" is of about the same purity as the zinc originally charged into the galvanizing bath and generally contains from about .15% to about .40% of iron with traces of lead and aluminum. By the present method recoveries of 85% are possible and recoveries of over 80% have been obtained commercially.

Altho gaseous fuel was used for heating the crucible in the above described operation of the process, it is to be understood that other heating means may be employed if desired. For example, the crucible and its contents may be heated by electrical induction heating apparatus.

Having thus described the present invention so that those skilled in the art may be able to understand and practice the same, I state that what I desire to secure by Letters Patent is defined in what is claimed.

What is claimed is:

1. The method of recovering zinc which includes the steps of reducing galvanizing by-products such as zinc ashes and sal skimmings to finely divided form and separating oxidized and foreign material therefrom, mixing a flux consisting of a chlorine containing ammonium compound with the resulting "zinc dust," charging such mixture into a crucible, heating the crucible and melting the charge contained thereon, removing the molten flux from said crucible, casting the molten metal, returning a quantity of the still molten flux to the crucible, adding a new charge of the mixture of "zinc" dust" and flux to the crucible, and repeating the foregoing steps.

2. The method of recovering zinc which includes the steps of reducing galvanizing by-products such as zinc ashes and sal skimmings to finely divided form and separating oxidized and foreign material therefrom, mixing a flux consisting of a chlorine containing ammonium compound with the resulting "zinc dust," charging such mixture into a crucible, heating the crucible and melting the charge contained thereon, removing the molten flux from said crucible, and casting the molten metal.

JAMES A. SMAIL.